US007558392B2

(12) United States Patent
Okabayashi

(10) Patent No.: US 7,558,392 B2
(45) Date of Patent: Jul. 7, 2009

(54) SIGNAL SWITCHING APPARATUS AND PROGRAM

(75) Inventor: Masaaki Okabayashi, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 777 days.

(21) Appl. No.: 10/676,228

(22) Filed: Sep. 30, 2003

(65) Prior Publication Data

US 2004/0066792 A1 Apr. 8, 2004

(30) Foreign Application Priority Data

Oct. 3, 2002 (JP) ............................ 2002-291357

(51) Int. Cl.
*H04B 1/00* (2006.01)

(52) U.S. Cl. ...................................... 381/119; 381/123

(58) Field of Classification Search ................. 381/119, 381/123, 81, 118; 700/94; 370/419, 535
See application file for complete search history.

(56) References Cited

U.S. PATENT DOCUMENTS 4,635,288 A * 1/1987 Stadius ........................ 381/119
5,774,567 A * 6/1998 Heyl .......................... 381/119
6,141,597 A * 10/2000 Botzko et al. ................. 700/94
6,795,560 B2 * 9/2004 Hamamatsu ................ 381/119

FOREIGN PATENT DOCUMENTS

JP 62-013100 1/1967
JP 10-303717 11/1998

* cited by examiner

*Primary Examiner*—Vivian Chin
*Assistant Examiner*—Lun-See Lao
(74) *Attorney, Agent, or Firm*—Morrison & Foerster LLP

(57) ABSTRACT

A signal switching apparatus is provided which is capable of performing checking in a manner that a plurality of output channels can be discriminated in checking the assignment of the plurality of output channels to buses to which signals are input. A plurality of signals input to a mix bus comprised of six buses are selectively output to two analog outputs in accordance with assignment performed by an output assigning device. First checking signals for three channels among six channels from a first oscillator are directly input to an adjuster, and first checking signals for the rest of the six channels from the first oscillator are input to a signal switching device. Second checking signals for all of three channels from a second oscillator are input to the checking signal switching device. The checking signal switching device selectively outputs the input first or second checking signals to the adjuster. The adjuster selectively outputs the input first and second checking signals to desired buses and at desired volumes in accordance with settings of the adjuster, and the first and second checking signals are output via respective analog outputs in accordance with settings of the output assigning device.

5 Claims, 4 Drawing Sheets

SIGNAL SWITCHING APPARATUS AND PROGRAM

BACKGROUND OF THE INVENTION

1. Field of the Invention

The present invention relates to a signal switching apparatus such as a mixer, which inputs a plurality of signals to a mix bus, assigns the input signals to respective desired output channels assigned to respective buses of the mix bus, and outputs the signals via the output channels, as well as a program for controlling the signal switching apparatus.

2. Description of the Related Art

Conventionally, as described e.g. in "Instruction Manual for Yamaha Digital Production Console DM2000", a signal switching apparatus such as a mixer for use at a broadcast station or the like has been known. This signal switching apparatus is capable of inputting a plurality of input signals to a mix bus comprised of a large number of buses, mixing them, subjecting them to predetermined processing, and outputting them via output channels assigned to buses of the mix bus. In general, this signal switching apparatus is provided with an oscillator, which generates a predetermined checking signal for ascertaining/checking in advance whether or not the actual assignment of buses to which signals are to be input and output channels via which the signals from the respective buses are to be output coincides with the user's intention. The user causes the checking signal generated from the oscillator to be input to the mix bus, and listens to sounds output via the output channels, thus checking settings as to output channels for the respective buses.

In the above described conventional signal switching apparatus, however, when checking is performed by inputting one signal from the oscillator to a plurality of (e.g. two) buses to which a plurality of (e.g. L/R) output channels are assigned, the same signal is outputted from the plurality of buses, and hence it is necessary to check outputs via the respective output channels while consciously trying to discriminate between the output channels. Therefore, it is not easy to perform checking.

SUMMARY OF THE INVENTION

It is therefore an object of the present invention to provide a signal switching apparatus which is capable of easily performing checking in a manner that a plurality of output channels can be discriminated in checking the assignment of the plurality of output channels to buses to which signals are input, as well as a program for controlling the signal switching apparatus.

To attain the above object, in a first aspect of the present invention, there is provided a signal switching apparatus that assigns a plurality of signals input to a mix bus comprising a plurality of buses, to respective desired output channels assigned to respective ones of the buses, and outputs the plurality of signals via the output channels, comprising a plurality of checking signal generating devices that generate checking signals different from each other, and a checking signal input device that causes the checking signals generated by the plurality of checking signal generating devices to be selectively input to respective desired buses of the mix bus.

Preferably, the plurality of buses are grouped into a plurality of groups.

More preferably, the checking signal input device comprises a selecting device that selects desired checking signals to be input to part of the plurality of groups from among the plurality of checking signals, and the checking signals selected by the selecting device are input to all of the buses belonging to the part of the plurality of groups.

More preferably, the checking signal input device causes part of the plurality of checking signals to be always input to all of buses belonging to a predetermined part of the plurality of groups.

According to the first aspect of the present invention, a plurality of different checking signals generated are selectively input to desired buses of the mix bus, and are output via the output channels assigned to the respective buses. As a result, it is possible to discriminate between the plurality of output channels and hence easily perform the checking.

To attain the above object, in a second aspect of the present invention, there is provided a program executed by a computer, for assigning a plurality of signals input to a mix bus comprising a plurality of buses, to desired output channels assigned to respective ones of the buses and outputting the plurality of signals via the output channels, comprising a checking signal generating module for generating a plurality of checking signals different from each other, and a checking signal input module for causing the plurality of checking signals generated by the checking signal generating module to be selectively input to respective desired buses of the mix bus.

A computer-readable storage medium storing the above program constitutes the present invention.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
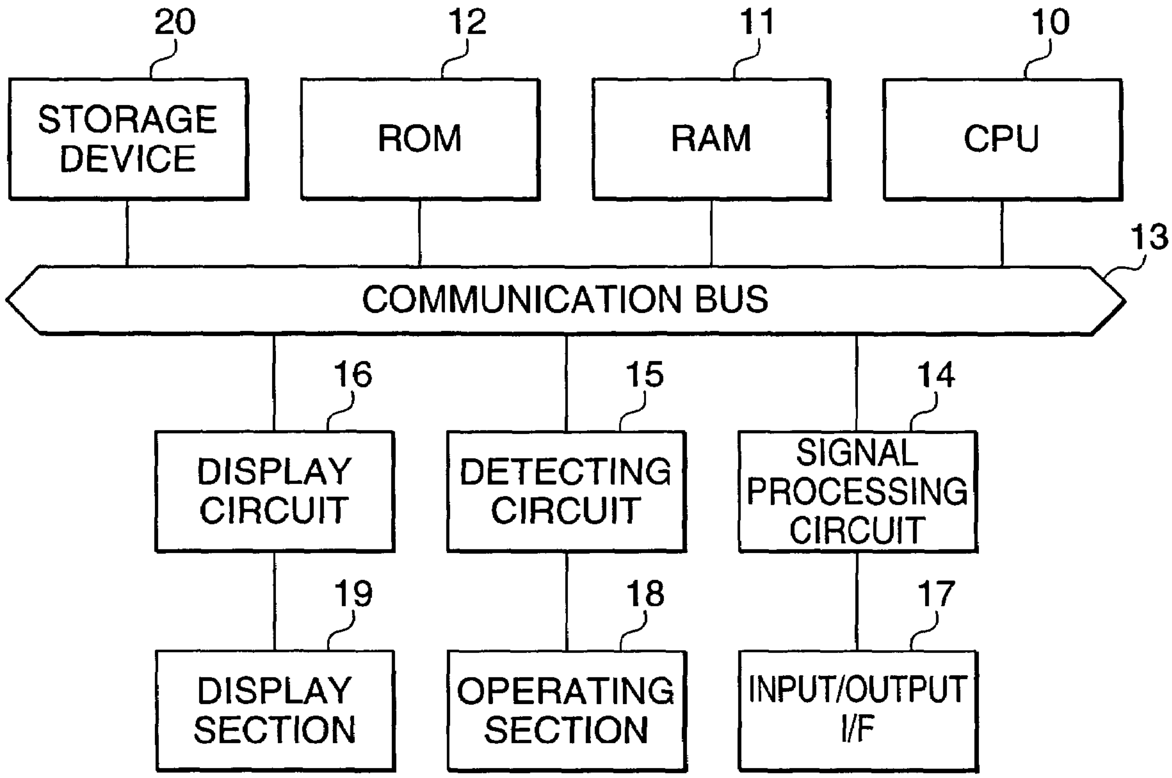
FIG. 1 is a block diagram showing the entire construction of a signal switching apparatus according to an embodiment of the present invention.

FIG. 1 is a block diagram showing the entire construction of a signal switching apparatus according to an embodiment of the present invention. This signal switching apparatus is implemented by a mixer, for example.

The signal switching apparatus according to the present embodiment is comprised of a RAM 11, a ROM 12, a signal processing circuit 14, a detecting circuit 15, a display circuit 16, and a storage device 20, a CPU 10, and a communication bus 13 via which the above components are connected to each other. Further, an operating section 18 is connected to the detecting circuit 15, and a display section 19 comprised of an LCD (Liquid Crystal Display), for example, is connected to the display circuit 16. An input/output interface (I/F) 17, which provides interface for inputting and outputting various kinds of signals, is connected to the signal processing circuit 14.

The operating section 18 has a plurality of switches, not shown, for inputting various kinds of information. The detecting circuit 15 detects the depression of each of the switches provided in the operating section 18. The display circuit 16 provides control to display various kinds of information such as a setting screen view on the display 19. The CPU 10 controls the overall operation of the signal switching apparatus. The ROM 12 stores control programs to be executed by the CPU 10, various kinds of tables, and a variety of data. The RAM 11 temporarily stores various kinds of input information, various kinds of flags, buffer data, calculation results, and so forth. The storage device 20 drives a storage medium, not shown, such as a floppy (registered trademark) disk, in which a variety of application programs such as the above mentioned control programs and a variety of data can be stored.

Figure 2:
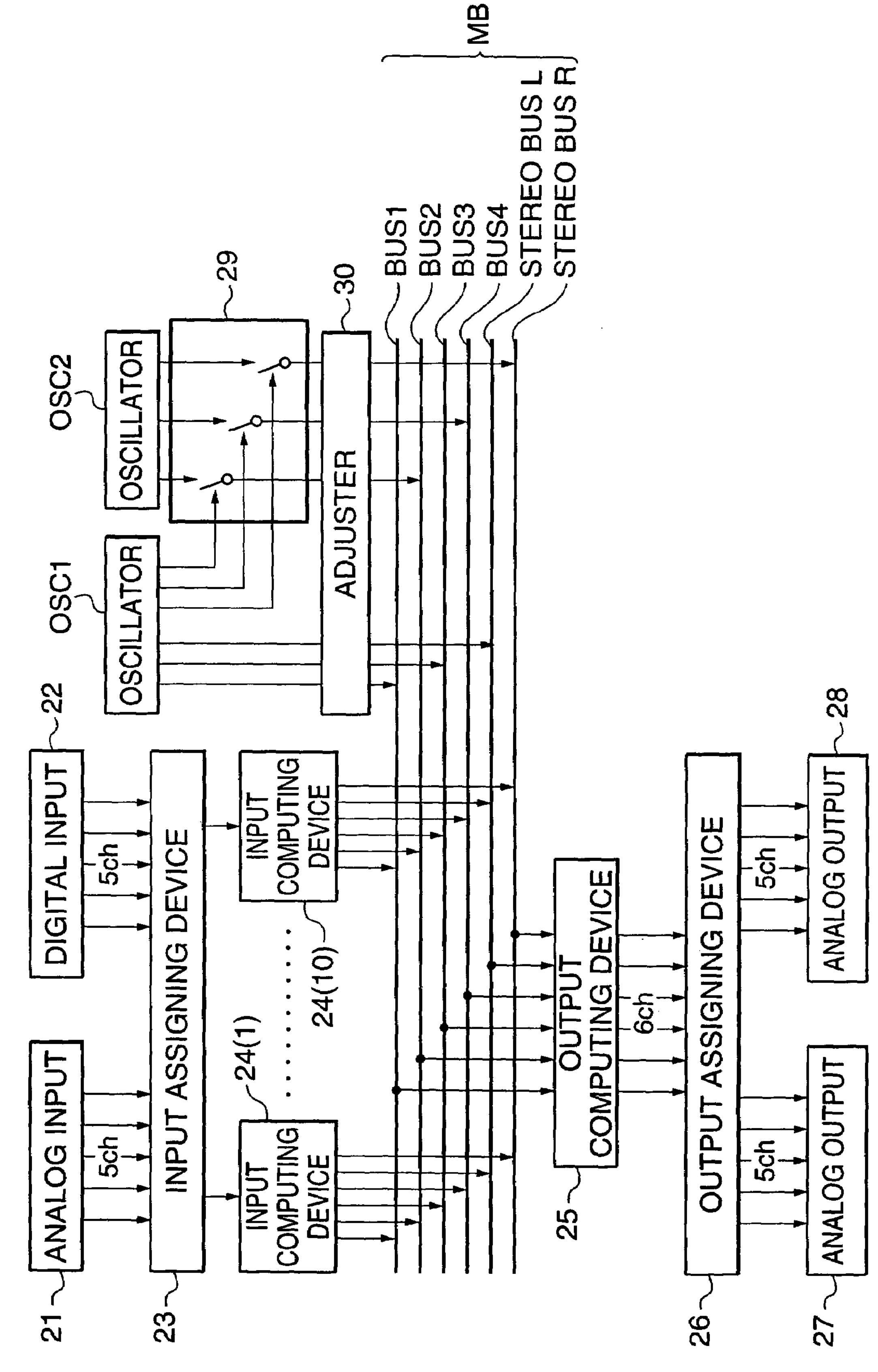
FIG. 2 is a diagram showing in detail the configurations of a signal processing circuit and an input/output interface.

FIG. 2 is a diagram showing in detail the configurations of the signal processing circuit 14 and the input/output interface 17. The signal processing circuit 14 includes a group of buses consisting of buses 1 to 4 and stereo buses L and R, and the group of buses (six buses in the present embodiment) constitutes a mix bus MB for mixing input signals. An analog input 21, a digital input 22, an input assigning device 23, and input computing devices 24(1) to 24(10) are provided as component parts for inputting signals to the mix bus MB; an output computing device 25, an output assigning device 26, and analog outputs 27 and 28 are provided as component parts for outputting signals input to the mix bus MB. In FIG. 2, the analog input 21, digital input 22, and analog outputs 27 and 28 correspond to the input/output interface appearing 17 in FIG. 1, and the other component parts correspond to the signal processing circuit 14.

Signals for five channels are input to the input assigning device 23 via each of the analog input 21 and the digital input 22. The input computing devices 24 are identical in construction with each other and corresponds in number to the maximum number of (ten in the present embodiment) input signals. The signals input to the input assigning device 23 are input to the corresponding ones of the input computing devices 24 for respective input channels. Namely, one input signal is input to one input computing device 24.

Figure 3:
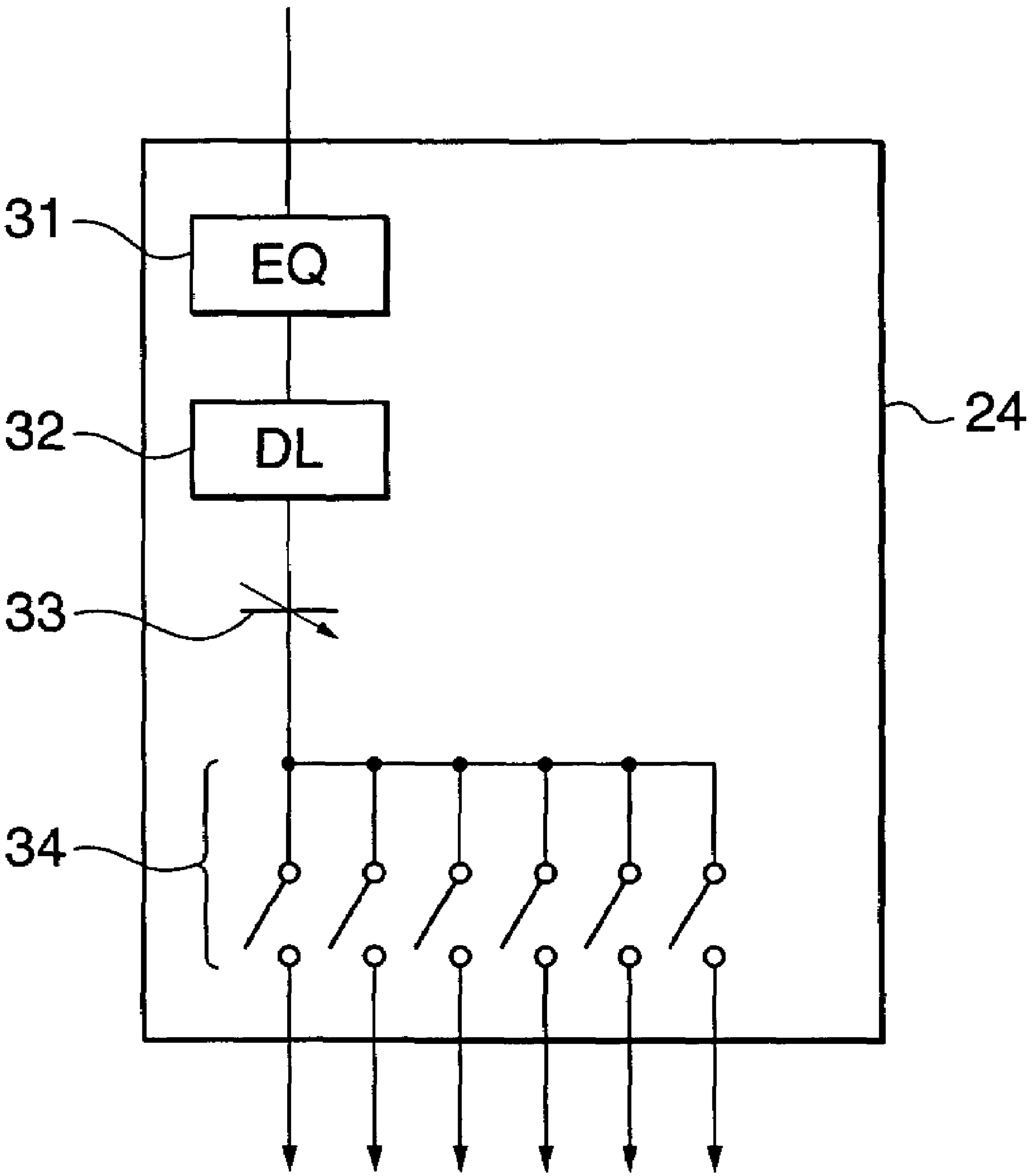
FIG. 3 is a diagram showing the internal configuration of one input computing device.

FIG. 3 is a diagram showing the internal configuration of one of the input computing devices 24. Each of the input computing devices 24 is comprised of an equalizer (EQ) 31, a delay device (DL) 32, a send-level adjuster 33, and switches 34. The equalizer 13 adjusts frequency characteristics of an input signal. The delay device 32 delays the input signal by a predetermined period of time to cause a delay in output of the input signal to the mix bus MB. The send-level adjuster 33 adjusts the volume (the amount of attenuation from a predetermined volume) of the input signal, which is sent to the mix bus MB. The switches 34 correspond in number to the number of buses (six in the present embodiment) constituting the mix bus MB, and are used for turning on/off output to the respective buses of the mix bus MB.

Referring again to FIG. 2, the signals input to the respective input computing devices 24 are subjected to processing by the respective equalizers 31, delay devices 32, and send-level adjusters 33, and are input to the buses of the mix bus MB, which correspond to switches 34 which are in an ON state.

The signals input to the mix bus MB are input to the output computing device 25 in six channels corresponding in number to the number of buses constituting the mix bus MB. Although not illustrated, the output computing device 25 is comprised of component parts for six channels, which are identical in function with the above described equalizer 31, delay device 32, and send-level adjuster 33, and correspond to the respective channels (or correspond to the respective buses), and signals in the respective channels are subjected to processing by the component parts and are separately output to the output assigning device 26.

The output assigning device 26 assigns the signals input from the output computing devices 25 to output channels, and selectively outputs the signals to the analog output 27 or to the analog output 28. It is assumed in the present embodiment that the analog output 27 is for an L (left) channel, and the analog output 28 is for an R (right) channel.

The statuses of the component parts in the input computing devices 24 and the assignment of the output channels in the output assigning device 26 are set through the operation of the operating section 18 (refer to FIG. 1).

As shown in FIG. 2, the signal processing circuit 14 is further provided with a checking signal switching device 29 and an adjusting device (adjuster) 30 in addition to two oscillators OSC1 and OSC2. The oscillators OSC1 and OSC2 are checking signal generators that generate different checking signals. The oscillator OSC1 outputs first checking signals for six channels, and the oscillator OSC2 outputs second checking signals for three channels. The first checking signals for three of the six channels from the oscillator OS1 are directly input to the adjuster 30, and the first checking signals for the rest of the six channels from the oscillator OS1 are input to the checking signal switching device 29. The second checking signals for all of the three channels are input to the checking signal switching device 29. The checking signal switching device 29 and the adjuster 30 constitute a checking signal input device.

The checking signal switching device 29 is comprised of a change-over switch, which selectively outputs the first checking signals for three channels from the oscillator OSC1 or the second checking signals for three channels from the oscillator OSC2 to the adjuster 30.

The adjuster 30 causes the first checking signals input form the oscillator OSC1 and the first or second checking signals input via the checking signal switching device 29 to be input to the mix bus MB. In the present embodiment, the first checking signals for three channels directly input from the oscillator OS1 to the adjuster 30 are input to the buses 1 and 3 and the stereo bus L (first bus group) so that they can be used for checking paths via which signals for the L (left) channel are output. On the other hand, the checking signals for three channels input via the checking signal switching device 29 are input to the buses 2 and 4 and the stereo bus R (second bus group) so that they can be used for checking paths via which signals for the R (left) channel are output. It should be noted that to which buses the first and second checking signals are to be input is not limited to the above.

The adjuster 30 is comprised of component parts, not shown, which are identical in construction with the send-level adjuster 33 and the switches 34 provided in the input computing device 24, and it is configured such that checking signals are input only to desired buses and at desired volumes in accordance with settings of these component parts. A description will be given later of settings of the adjuster 30 and settings of the checking signal switching device 29 with reference to FIG. 4.

Similarly to the input signals via the analog input 21 and the digital input 22, the checking signals input to the mix bus MB are selectively output via the analog outputs 27, 28 according to settings of the output computing device 25 and the output assigning device 26.

Figure 4:
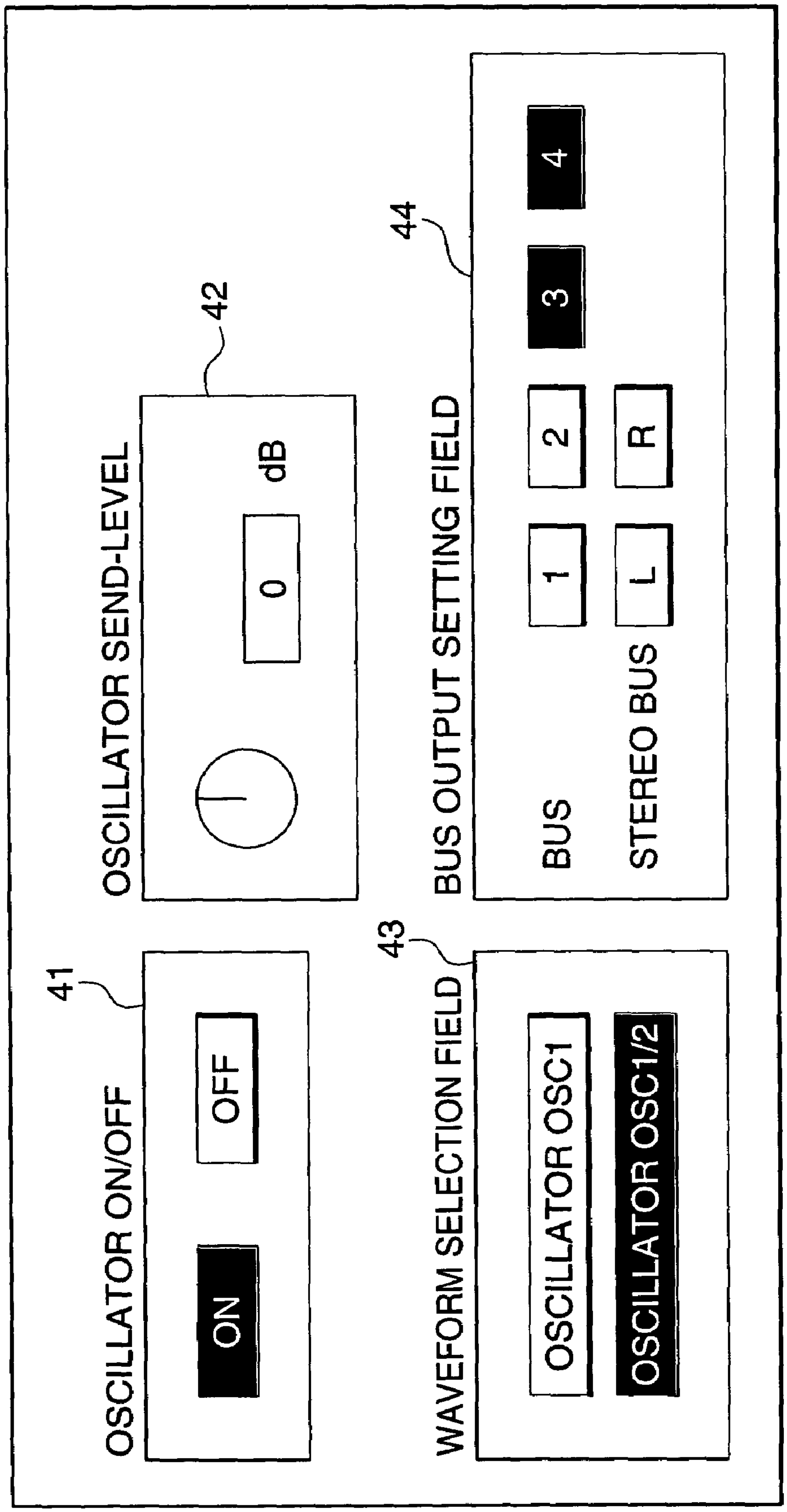
FIG. 4 is a diagram showing an example of an operator setting screen view.

FIG. 4 is a diagram showing an example of an oscillator setting screen view, which is displayed on the display section 19 (refer to FIG. 1) in an oscillator setting mode. In FIG. 4, an oscillator on/off field 41 specifies whether to activate or deactivate the oscillators OSC1 and OSC2. For example, if the oscillator on/off field 41 is set to "ON", both the oscillators OSC1 and OSC2 are activated to generate the respective first and second checking signals, and on the other hand, if the oscillator on/off field 41 is set to "OFF", both the oscillators OSC1 and OSC2 are deactivated.

A waveform selection field 43 specifies settings of the checking signal switching device 29 by selection of "oscillator OSC1" or "oscillator OSC1/2". That is, if "oscillator OSC1" is selected, the checking signal switching device 29 outputs the first checking signals for three channels input from the oscillator OSC1 to the adjuster 30, and if "oscillator OSC1/2" is selected, the checking signal switching device 29 outputs the second checking signals for three channels input from the oscillator OSC2 to the adjuster 30.

The types e.g. waveform and frequency of the checking signals to be generated by the oscillators OSC1 and OSC2 can be selected arbitrarily or from among a plurality of options; for example, "sine curve 1 kHz" can be selected. The selected types of checking signals for the respective oscillators OSC1 and OSC2 are set on a setting screen view, not shown.

An oscillator send-level field 42 specifies settings of the above-mentioned send-level adjuster, not shown, provided in the adjuster 30. That is, the oscillator send-level field 42 is used for adjusting the volumes (amounts of attenuation) of the first and second checking signals, which are to be input to the adjuster 30 and output to the mix bus MB. The volumes of the first and second checking signals can be adjusted for the respective corresponding buses of the mix bus MB. The send-level may be adjusted collectively for signals which are to be input to the adjuster 30. Alternatively, a send-level adjuster may be disposed immediately after each of the oscillators OSC1 and OSC2 so that the send-level can be adjusted for each of the oscillators OSC1 and OSC2.

A bus output setting field 44 specifies settings of the above-mentioned switches, not shown, provided in the adjuster 30. That is, by selecting a bus as a destination, it is possible to make a setting as to whether or not each of the first and second checking signals input to the adjuster 30 is to be output to the corresponding bus of the mix bus MB. For example, when only the buses 3 and 4 are selected, the first checking signal is input from the adjuster 30 to the bus 3 and the first or second checking signal is input from the adjuster 30 to the bus 4.

With the above arrangement, a checking process for ascertaining in advance whether or not the actual assignment of output channels to respective buses coincides with the user's intention is carried out in a manner described below. A description will be given of how the checking process is carried out to check outputs from the two buses 3 and 4 using the two oscillators OSC1 and OSC2, for example.

After setting the component parts in the input computing devices 24 and carrying out assignment of the output channels in the output assigning device 26, the user causes the oscillator setting screen appearing in FIG. 4 to be displayed, sets the oscillator on/off field 41 to "ON", sets the waveform selection field 43 to "oscillator OSC1/2", sets the bus output setting field 44 such that the buses 3 and 4 are selected, and adjusts the volume as appropriate in the oscillator send-level field 42. It is assumed here that in the output assigning device 26, the respective output channels of the buses 3 and 4 of the mix bus MB are assigned to the analog outputs 27 and 28, respectively.

According to the above described settings, among the first checking signals for three channels directly input from the oscillator OSC1 to the adjuster 30, only one corresponding to the bus 3 is input to the bus 3. The first checking signals for the other three channels input from the oscillator OSC1 to the checking signal switching device 29 are blocked by the checking signal switching device 29, so that they are not input to the adjuster 30 and the mix bus MB. On the other hand, the second checking signals for three channels input from the oscillator OSC2 to the checking signal switching device 28 are input to the adjuster 30, and only one of them corresponding to bus 4 is input to the bus 4.

Then, the first checking signal is output from the bus 3 to the analog output 27 via the output computing device 25 and the output assigning device 26, and the second checking signal is output from the bus 4 to the analog output 28 via the output computing device 25 and the output assigning device 26. By listening to sounds output via the analog outputs 27 and 28, the user can ascertain whether tones are sounded or not via his/her desired output channels. In particular, since the first and second checking signals are different from each other and output sounds are different from each other, outputs via the L/R channels can be correctly checked at a time.

According to the present embodiment, the two oscillators OSC1 and OSC2 generate the respective first and second checking signals different from each other, so that the first and second checking signals are selectively input to the respective desired buses of the mix bus MB, and are output as sounds according to the assignment of the output channels in the output assigning device 26. As a result, checking can be easily performed with very few errors, making it unnecessary to check outputs via the respective L/R channels while consciously trying to discriminate between them. Thus, checking can be easily performed in a manner that the plurality of output channels can be discriminated.

Incidentally, it is possible to perform checking using a single checking signal as in the prior art by setting the waveform selection field 43 to "oscillator OSC1".

The number of buses constituting the mix bus MB is not limited to six as above.

Although in the present embodiment, checking is performed in a manner discriminating between the L/R channels, the present invention is not limited to this, but the number of channels subjected to checking may be set to three or more by increasing the number of oscillators. For example, it is assumed that a center channel is provided in addition to the L channel and the R channel, and a setting is made such that signals from the buses 1 and 4 are output via the L channel, signals from the bus 2 and the stereo bus L are output via the center channel, signals from the bus 3 and the stereo bus R are output via the R channel. In this case, from oscillators OSC1, OSC2, and OSC3 provided for generating respective first, second, and third checking signals different from each other, the first checking signals are input to the buses 1 and 4, the second checking signal are input to the bus 2 and the stereo bus L, and the third checking signals are input to the bus 3 and the stereo bus R. In this way, the three channels, i.e. the L channel, center channel, and R channel can be checked at a time.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium on which the program code is stored constitute the present invention. The storage medium for supplying the program code is not limited to a ROM, and a floppy (registered trademark) disk, a hard disk, an optical disk, a magnetic-optical disk, a CD-ROM, a CD-R, a CD-RW, a DVD-ROM, a DVD-RAM, a DVD–RW, a DVD+RW, an NV-RAM, a magnetic tape, a nonvolatile memory card, and a download carried out via a network may be used.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment thereof may be accomplished by writing the program code read out from the storage medium into a memory provided in an expansion board inserted into a computer or a memory provided in an expansion unit connected to-the computer and then causing a CPU or the like provided in the expansion board or the expansion unit to perform a part or all of the actual operations based on instructions of the program code.

What is claimed is:

1. A signal switching apparatus comprising:

a plurality of buses, a first oscillator device that generates first checking signals used for checking output path and adapted to provide the generated first checking signals to at least a first group of the plurality of buses;

a second oscillator device that generates second checking signals used for checking output path and is adapted to provide the generated second checking signals to only a second group of the plurality of buses, the first checking signals and the second checking signals different from each other; and a checking signal input device that causes the second checking signals to be input to the second group of the plurality of buses and causes the first checking signals to be input to the first group of the plurality of buses.

2. A signal switching apparatus according to claim 1, wherein the first group of the plurality of buses includes two or more buses, wherein the second group of the plurality of buses includes two or more buses, wherein the plurality of buses consists of the first group of the plurality of buses and the second group of the plurality of buses, and wherein the second group of the plurality of buses does not include any of the first group of the plurality of buses.

3. A signal switching apparatus according to claim 1, wherein the first checking signals and the second checking signals represent a sine waveform.

4. A signal switching apparatus comprising:

a plurality of buses;

a first oscillator device that generates first checking signals used for checking an output path and is capable of providing the generated first checking signals to one or more buses from the plurality of buses;

a second oscillator device that generates second checking signals used for checking an output path and is capable of providing the generated second checking signals to only a group of buses from the plurality of buses, wherein the first checking signals and the second checking signals are different from each other;

a selecting device that selects both the first checking signals and the second checking signals or only the first checking signals as checking signals to be input to all of said plurality of buses, and a checking signal input device that causes the second checking signals to be input to the group of buses and the first checking signals to be input to the other buses of the plurality of buses if said selecting device selects both the first checking signals and the second checking signals, and causes the first checking signals to be input to all of said plurality of buses if said selecting device selects only the first checking signals.

5. A signal switching apparatus according to claim 4, wherein the first checking signals and the second checking signals represent a sine waveform.

* * * * *